E. F. W. ALEXANDERSON.
MOTOR CONTROL.
APPLICATION FILED DEC. 17, 1907.

936,071.

Patented Oct. 5, 1909.
2 SHEETS—SHEET 2.

Witnesses.
J. Earl Ryan
J. Ellis Glu.

Inventor.
Ernst F. W. Alexanderson
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR CONTROL.

936,071.  Specification of Letters Patent.  Patented Oct. 5, 1909.

Application filed December 17, 1907. Serial No. 406,842.

*To all whom it may concern:*

Be it known that I, ERNST F. W. ALEXANDERSON, a citizen of the United States, residing at Schenectady, in the county of Schenectady and State of New York, have invented certain new and useful Improvements in Motor Control, of which the following is a specification.

My invention relates to the control of alternating-current motors of the commutator type, and its object is to improve the torque at starting and the power-factor in running.

One well-known type of alternating-current commutating motor has two windings on the stator, one of which is ordinarily termed the exciting winding, and produces a magnetization electrically at right-angles to the line of the armature magnetomotive force, while the other winding produces a magnetomotive force in line with the armature. This latter winding is ordinarily termed, in series motors, in which the armature is connected in series with the two stator windings, the "compensating winding", since its function is to compensate for armature reaction and self-induction, but when the armature is short-circuited for repulsion-motor operation, it is ordinarily termed the "inducing winding", since it is the winding which serves to induce current in the armature. For convenience I shall term this winding the "inducing winding", with the understanding that I do not thereby limit myself to an operation of the motor, in which the armature is at all times short-circuited.

In a former patent No. 923,754, dated June 1, 1909, I disclosed a control system for a motor of the type to which my present invention relates, in which at starting the armature was short-circuited, during acceleration the exciting winding was included in the armature short-circuit to produce leakage fields to compensate for commutation reactance, and at full speed an electromotive force was impressed on the armature and exciting windings in series to prevent the effect of the inducing field on the commutation from becoming excessive.

My present invention consists in an improvement in the control system described in my earlier patent.

One feature of my present invention relates to the starting connections. Since at starting there is no electromotive force induced by rotation in the short-circuited coils to off-set the electromotive force induced by the transformer action of the exciting winding, this transformer action must be limited, as for example by limiting the strength of the field, at starting, in order to prevent excessive currents in the short-circuited coils, which would produce sparking. Weakening the field at starting is disadvantageous, however, from the standpoint of torque, since the currents induced in the armature coils short-circuited by the brushes react on the field that produces them, and distort the phase of the exciting flux, so that it is no longer in phase with the armature current.

One feature of my present invention consists in a novel arrangement at starting, whereby the strength of the exciting flux is automatically limited, while at the same time the distortion of its phase is largely prevented. I accomplish this by shunting the exciting winding at starting with a reactive coil which may be included in the motor structure or independent thereof. If the magnetic circuit of this coil is so designed that it is saturated by the starting current, it serves automatically to limit the strength of the exciting flux, since, while for any current-strength below that which saturates the core of the reactive coil, the current divides between the exciting winding and the reactive coil in proportion to their relative reactances, yet when the reactive coil becomes saturated any further increase of current passes almost entirely through the reactive coil, since its reactance cannot further increase. Thus the current in the exciting winding, and consequently the exciting flux, is limited definitely to a predetermined value. Furthermore, the reaction of the short-circuit currents on the exciting flux, which tends to shift the phase of that flux, and consequently the phase of the counter-electromotive force of self-induction of the exciting winding, produces a cross-current between the exciting winding and the reactive coil, which tends to restore the flux of the exciting winding to its proper phase, and thereby maintains a high starting torque.

When the motor has started and the exciting winding is placed in series with the armature, as described in my former patent, the phase of the current in the exciting winding is somewhat altered, since it no longer is traversed by the magnetizing current which flows in the inducing winding, that is, the component of the current in the inducing winding which produces the flux which induces the counter e. m. f. of the inducing winding and the e. m. f. in the short-circuited armature. This change in phase slightly lowers the power-factor of the motor. One feature of my invention consists in a novel connection which not only prevents this lowering of the power-factor, but serves to increase it. This arrangement consists in impressing a shunt-excitation on the exciting winding in series with the reactive coil. The shunt excitation could not be impressed directly on the exciting winding, since this would positively fix the phase of its flux; but by placing a reactive coil in series with the exciting winding, the phase of the exciting flux may be controlled as desired, and since the phase of the counter-electromotive force of the armature depends on the phase of the flux exciting winding, the power-factor of the motor may be controlled in this manner.

My invention will best be understood by reference to the accompanying drawings, in which—

Figures 1 to 6, inclusive, are diagrams of the connections of the motor at starting and at different speeds, and Fig. 7 shows diagrammatically a motor provided with the controlling switch arranged in accordance with my invention to produce the circuit connections shown in Figs. 1 and 6.

In the drawings, A represents the motor-armature, which is shown diagrammatically as of the commutator type, B is the exciting winding producing a magnetomotive force at right-angles to that of the commutator, C is the inducing or compensating winding producing a magnetomotive force in line with the armature, D is a transformer winding for supplying the current to the motor, and E is a reactive coil which as has been said may be comprised within the motor structure or may be entirely separate from the motor.

In Fig. 1, the armature A is short-circuited, and the two stator windings B and C are connected in series with each other and to a portion of the supply-transformer. The connections, as thus far described, are those usually employed for repulsion-motor operation. In addition to the usual connections, the reactive coil E, or a portion of it, is connected in shunt to the exciting winding B. If the same reactive coil is to be employed for the other connections to be described later, its number of turns will ordinarily be such that only a portion of the coil is required for the starting connections of Fig. 1. The functions of the reactive coil when connected as in Fig. 1, are, as has already been mentioned, first to shunt a portion of the current from the exciting winding, and thereby to weaken the exciting flux at starting; second, by the saturation of its magnetic circuit, to limit automatically the amount of the exciting flux; and third to prevent a distortion of the phase of the exciting flux by permitting a flow of cross-currents through the exciting winding B and the reactive coil which tend to restore the exciting flux to its proper phase.

Fig. 2 differs from Fig. 1 only in that the voltage impressed on the motor circuits is increased.

In Fig. 3 the circuit of the reactive coil is opened, so as to produce the usual repulsion-motor connections, and, consequently, to strengthen the exciting flux.

In Fig. 4 is shown a connection which, if the reactive coil E and its connections were omitted, would be the same as that disclosed as a running connection in my earlier patent, above referred to. Exciting winding B is connected in series with the armature A, and a small shunt-excitation derived from the transformer winding D is impressed on the two windings in series. Thus introducing the reactance of the exciting winding B into the armature circuit, results in producing leakage fields which, when cut by the armature coils short-circuited in commutation, produce electromotive forces in those coils tending to neutralize the electromotive force due to commutation reactance; and the small shunt-excitation impressed on the armature and exciting windings in series serves to reduce the strength of the inducing field; the effect of which on commutation would otherwise become excessive at high speeds, as is fully explained in my prior patent. In addition to the connections thus far described, which are the same as those described in my earlier patent, the reactive coil E is placed in series with the exciting winding B and the shunt voltage. This connection results in somewhat shifting the phase of the exciting flux so as not only to prevent the decrease in power-factor, which would otherwise result from including the exciting winding in the armature circuit, but even if the reactive coil E has the proper amount of reactance, to increase the power-factor of the motor through shifting the counter-electromotive force induced in the armature by its rotation.

Figure 1:
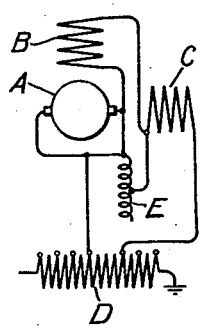
Figure 2:
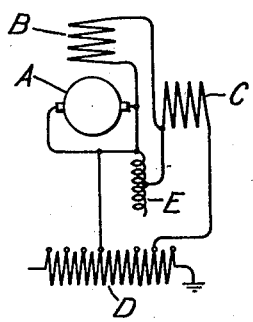
Figure 3:
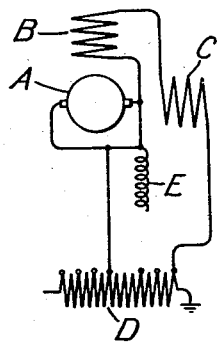
Figure 4:
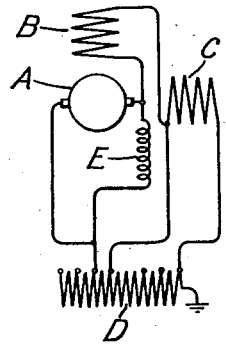
Figure 5:
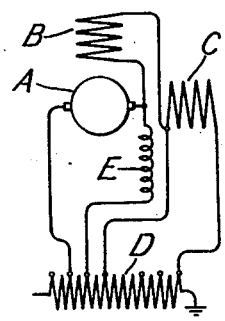
Fig. 5 is similar to Fig. 4, except that the shunt electromotive force impressed on the armature and exciting windings in series is increased to adjust the motor for higher speed by further weakening the inducing field.
Figure 6:
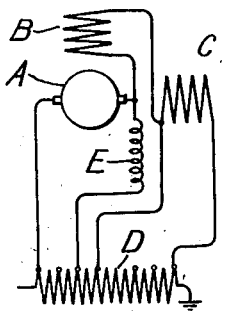
Fig. 6 is the same as Fig. 5, except that the electromotive force impressed on the armature and exciting windings is still further increased to adapt the motor for still higher speed.
Figure 7:
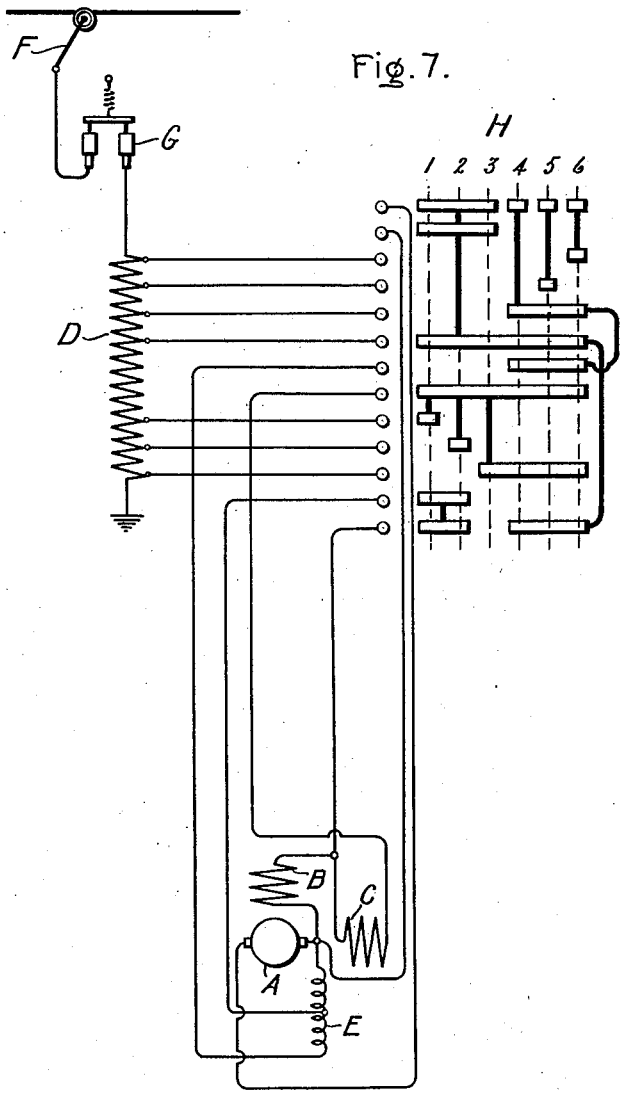

In Fig. 7 the transformer winding D is shown diagrammatically as supplied from a trolley F, through a cutout-switch or circuit-breaker G. H represents a controller having its contacts organized to produce the several circuit connections shown in the diagrams of Figs. 1 and 6. I have shown the controller diagrammatically as of the well-known drum type, with its contacts developed on a plane surface. The stationary contact fingers are indicated by small circles and the movable contacts by rectangles. The several positions of the controller are shown by dotted lines, each of which is numbered to correspond with the figure which shows the circuit connections corresponding with that position. Since each set of connections and its purpose have already been described, no further description of Fig. 7 is necessary. Although only a single motor is shown in Fig. 7, it will be understood that as many motors as desired may be controlled by a single controller. The controller may of course be of any desired construction, the arrangement illustrated being that which is commonly employed in diagrammatic illustrations.

What I claim as new and desire to secure by Letters Patent of the United States, is,

1. In combination with an alternating-current motor of the commutator type having inducing and exciting windings on the stator, a reactive coil, and a controlling switch arranged in its starting position to short-circuit the motor armature and to connect the stator windings in series with each other with the reactive coil in shunt to the exciting winding, the magnetic circuit of said reactive coil being arranged to be saturated by the starting current.

2. In combination with an alternating-current motor of the commutator type having inducing and exciting windings on the stator, a reactive coil, and means for connecting the stator windings in series and impressing a shunt excitation on the exciting winding and reactive coil in series.

3. In combination with an alternating-current motor of the commutator type having inducing and exciting windings on the stator, a reactive coil, and a controlling switch arranged in its starting position to connect the stator windings in series with each other with the reactive coil in shunt to the exciting winding, and in a subsequent position to impress a shunt excitation on the exciting winding and reactive coil in series.

4. In combination with an alternating-current motor of the commutator type having inducing and exciting windings on the stator, a reactive coil, a transformer winding for supplying current to the motor, and a controlling switch arranged in one of its positions to connect the exciting and armature windings of the motor in series and to a portion of said transformer winding and to establish a connection from the junction of the exciting and armature windings through said reactive coil to an intermediate point on the transformer winding.

5. In combination with an alternating-current motor of the commutator type having inducing and exciting windings on the stator, a reactive coil, a transformer winding for supplying current to the motor, and a controlling switch arranged in one of its positions to connect the motor windings to the transformer winding with the inducing, exciting and armature windings in series in the order named, and to establish connections from both terminals of the exciting winding to intermediate points on the transformer winding, said reactive coil being included in one of said connections.

6. In combination with an alternating-current motor of the commutator type having inducing and exciting windings on the stator, a reactive coil, and a controlling switch arranged in its starting position to short-circuit the motor armature and to connect the stator windings in series with each other with the reactive coil in shunt to the exciting winding, and in a subsequent position to impress a shunt excitation on the exciting and armature windings in series.

7. In combination with an alternating-current motor of the commutator type having inducing and exciting windings on the stator, a reactive coil, and a controlling switch arranged in its starting position to short-circuit the motor armature and to connect the stator windings in series with each other with the reactive coil in shunt to the exciting winding and in a subsequent position to connect exciting and armature windings in series with each other and to impress a shunt excitation in the exciting winding and said reactive coil in series.

In witness whereof, I have hereunto set my hand this 16th day of December, 1907.

ERNST F. W. ALEXANDERSON.

Witnesses:
BENJAMIN B. HULL,
HELEN ORFORD.